United States Patent
Chen et al.

(10) Patent No.: US 12,292,519 B2
(45) Date of Patent: May 6, 2025

(54) METHOD, APPARATUS, COMPUTER STORAGE MEDIUM, AND TERMINAL FOR REALIZING POSITIONING RESOLUTION

(71) Applicant: TruePoint Technology Inc., Beijing (CN)

(72) Inventors: Kongzhe Chen, Beijing (CN); Guangyu Zhou, Beijing (CN); Jingbo Gao, Beijing (CN)

(73) Assignee: TRUEPOINT TECHNOLOGY INC., Beijing (CN)

( * ) Notice: Subject to any disclaimer, the term of this patent is extended or adjusted under 35 U.S.C. 154(b) by 345 days.

(21) Appl. No.: 17/835,860

(22) Filed: Jun. 8, 2022

(65) Prior Publication Data

US 2023/0258823 A1 Aug. 17, 2023

(30) Foreign Application Priority Data

Feb. 16, 2022 (CN) .......................... 202210140872.2

(51) Int. Cl.
*G01S 19/44* (2010.01)
*G01S 19/12* (2010.01)
(Continued)

(52) U.S. Cl.
CPC .............. *G01S 19/44* (2013.01); *G01S 19/12* (2013.01); *G01S 19/04* (2013.01); *G01S 19/07* (2013.01); *G01S 19/43* (2013.01)

(58) Field of Classification Search
CPC .......... G01S 19/04; G01S 19/44; G01S 19/07; G01S 19/12; G01S 19/43
(Continued)

(56) References Cited

U.S. PATENT DOCUMENTS 7,515,100 B2 * 4/2009 Gradine .................. G01S 19/43
342/357.41
8,612,172 B2 * 12/2013 Wirola .................... G01S 19/45
702/182
(Continued)

FOREIGN PATENT DOCUMENTS

CN 114114343 A * 3/2022 ............. G01S 19/37
CN 114488238 A * 5/2022 ............. G01S 19/46
(Continued)

*Primary Examiner* — Chuong P Nguyen
(74) *Attorney, Agent, or Firm* — HAUPTMAN HAM, LLP

(57) ABSTRACT

A method includes when a first mobile station uploads an observation value, determining whether a tracking station for performing Real-Time Kinematic (RTK) resolution on the first mobile station is included; otherwise, determining a second mobile station that obtains an RTK fixed solution and satisfies a preset condition as a temporary base station; selecting one of the determined temporary base stations as the tracking station for performing RTK resolution on the first mobile station; and performing RTK resolution according to the selected tracking station for performing RTK resolution on the first mobile station. The second mobile station is another mobile station other than the first mobile station. When the tracking station for performing RTK resolution on the first mobile station is not included, a temporary base station is selected for RTK resolution, and the coverage of an RTK service is expanded without adding the tracking station.

10 Claims, 2 Drawing Sheets

---

When a first mobile station uploads an observation value, determining whether a tracking station for performing Real-Time Kinematic (RTK) resolution on the first mobile station is comprised — 101

When it is determined that the tracking station for performing RTK resolution on the first mobile station is not comprised, determining the second mobile station that obtains an RTK fixed solution and satisfies a preset condition as the temporary base station — 102

Selecting one of the determined temporary base stations as the tracking station for performing RTK resolution on the first mobile station — 103

Performing RTK resolution according to the selected tracking station for performing RTK resolution on the first mobile station — 104

(51) Int. Cl.
*G01S 19/04* (2010.01)
*G01S 19/07* (2010.01)
*G01S 19/43* (2010.01)

(58) Field of Classification Search
USPC ............ 342/357.27, 357.26, 357.41, 357.44, 342/357.49
See application file for complete search history.

(56) References Cited

U.S. PATENT DOCUMENTS

| | | | |
|---|---|---|---|
| 11,906,638 B2 * | 2/2024 | Wang | G01S 19/36 |
| 2021/0318451 A1 * | 10/2021 | Wang | G01S 19/36 |
| 2023/0168335 A1 * | 6/2023 | Chen | G01S 19/40 |
| | | | 455/456.1 |
| 2023/0280470 A1 * | 9/2023 | Lee | G01S 19/51 |
| | | | 342/357.26 |

FOREIGN PATENT DOCUMENTS

| | | | | | |
|---|---|---|---|---|---|
| CN | 116125507 A | * | 5/2023 | ............ | G01S 19/41 |
| CN | 117492035 A | * | 2/2024 | ............ | G01S 19/20 |
| CN | 112924998 B | * | 3/2024 | ............ | G01S 19/43 |
| WO | WO-2023172342 A1 | * | 9/2023 | ............ | G01S 19/07 |

* cited by examiner

METHOD, APPARATUS, COMPUTER STORAGE MEDIUM, AND TERMINAL FOR REALIZING POSITIONING RESOLUTION

RELATED APPLICATIONS

The present application claims priority from Chinese Application Number 202210140872.2, filed Feb. 16, 2022, the disclosure of which is hereby incorporated by reference herein in its entirety.

TECHNICAL FIELD

The disclosure relates to but is not limited to satellite positioning technology, and in particular, to the method, the apparatus, the computer storage medium, and the terminal for realizing positioning resolution.

BACKGROUND

At present, there are five widely used Global Navigation Satellite Systems (GNSSs) in the world, namely the Global Positioning System (GPS) of the United States, GLONASS of Russia, Beidou of China, Galileo of the European Union, and the Quasi-Zenith Satellite System of Japan. The satellite positioning system has high precision and covers the whole world, and has been widely applied in many fields such as navigation, surveying and mapping, precision agriculture, intelligent robots, and unmanned driving and unmanned aerial vehicles. Main factors that affect the accuracy of satellite positioning include satellite orbit and clock errors, and atmospheric propagation errors. The error of satellite orbit and clock error resolved in real time by means of broadcast ephemeris is generally meter-level. For example, the accuracy of GPS broadcast ephemeris is 1-2 meters, and the accuracy of GLONASS broadcast ephemeris is several meters. The atmospheric propagation errors are mainly ionospheric and tropospheric errors. At noon, the ionospheric error may be up to several tens of meters for a low-elevation satellite, and a dual-frequency receiver can eliminate the ionospheric error by means of a dual-frequency observation value. Tropospheric delay may be up to 10 meters for the low-elevation satellite, and 90% of the tropospheric error can be eliminated by means of a tropospheric model. In the absence of corrections, a high-performance dual-frequency receiver can only achieve meter-level positioning accuracy. For industries that require decimeter-level or even centimeter-level positioning accuracy, such as surveying and mapping, precision agriculture, intelligent robots, intelligent driving, shared travel, and electronic fences, Real-Time Kinematic (RTK) technology is mainly used to improve positioning accuracy. The RTK technology uses the error correlation between observation values of adjacent receivers to establish a tracking station (also called a base station) where the location is known. The satellite clock error is completely eliminated by a single difference between the tracking station and the mobile station (also called the user receiver), while attenuating the satellite orbit error, the ionospheric error, and the tropospheric error. If the distance between two stations is short, for example, less than 10 kilometers, after the satellite clock error is eliminated by the single difference between the tracking station and the mobile station, the residual error is only centimeter-level. Therefore, RTK can provide centimeter-level relative positioning accuracy.

Because the RTK resolution requires observation values of base stations, an RTK receiver needs to have the communication function. The RTK receiver requires a fixed ambiguity to achieve centimeter-level high-precision positioning, while ambiguity search (Teunissen, 1995) requires more computing resources and memory resources. The RTK resolution can be completed on a mobile station, and can also be completed on a cloud platform. A mobile station having a communication function may receive data of a tracking station from a network to complete the RTK resolution in the mobile station, and may also send an observation value of the mobile station to a cloud platform, and the cloud platform performs the RTK solution based on the received observation values of multiple tracking stations and multiple mobile stations.

For a wide range of applications, the RTK resolution requires sufficient tracking stations support. RTK uses the error correlation between the tracking stations and the mobile stations to eliminated positioning errors, these error correlations weaken as the distances between the tracking stations and the mobile stations increase, and the effective operating range of a single tracking station is generally within a radius of 30 kilometers. For a wide range of applications such as intelligent driving, industrial drones, and agricultural machinery, multiple tracking stations need to be established in an operation area, and the mobile station uses the data of the closest tracking station to perform RTK resolution. For a national or even global applications such as shared travel and vehicle monitoring, tens of thousands of tracking stations need to be established to ensure that all mobile stations can obtain data from tracking stations within 30 kilometers of any location. Moreover, in regions with active ionosphere, such as low latitude regions (between 30° S and 30° N), and the peak ionospheric activity on a decadal cycle (Bradford, 1996), RTK ambiguity is difficult to fix even when the distance between the mobile station and the tracking station is more than 10 kilometers. In this case, fast ambiguity fixation can only be achieved by increasing the density of tracking stations; this will undoubtedly increases the construction and maintenance costs of the tracking stations.

How to realize RTK resolution without increasing the density of tracking stations has become a problem to be solved.

SUMMARY

The following is a summary of the subject matter detailed in the disclosure. This summary is not intended to limit the scope of protection of the claims.

Embodiments of the present invention provide a method and an apparatus, a computer storage medium, and a terminal for realizing positioning resolution, which can expand the coverage of the RTK service without adding the tracking station.

The embodiments of the present invention provide a method for realizing positioning resolution, comprising:
  when a first mobile station uploads an observation value, determining whether a tracking station for performing Real-Time Kinematic (RTK) resolution on the first mobile station is comprised;
  when determining that the tracking station for performing RTK resolution on the first mobile station is not comprised, determining a second mobile station that obtains an RTK fixed solution and satisfies a preset condition as a temporary base station;
  selecting one of the determined temporary base stations as the tracking station for performing RTK resolution on the first mobile station; and performing RTK resolution according to the selected tracking station for performing RTK resolution on the first mobile station;

wherein the second mobile station is another mobile station other than the first mobile station.

In another aspect, the embodiments of the present invention further provide a computer storage medium, wherein a computer program is stored in the computer storage medium, and when the computer program is executed by a processor, the method for realizing positioning resolution is implemented.

In yet another aspect, the embodiments of the present invention further provide a terminal, including a memory and a processor, a computer program being stored in the memory, wherein the processor is configured to execute the computer program in the memory; and when the computer program is executed by the processor, the method for realizing positioning resolution is implemented.

In still another aspect, the embodiments of the present invention further provide an apparatus for realizing positioning resolution, including a judging unit, a determining unit, a selecting unit, and a resolving unit, wherein the judging unit is configured to: when a first mobile station uploads an observation value, determine whether a tracking station for performing Real-Time Kinematic (RTK) resolution on the first mobile station is comprised;

the determining unit is configured to: when determining that the tracking station for performing RTK resolution on the first mobile station is not comprised, determine a second mobile station that obtains an RTK fixed solution and satisfies a preset condition as a temporary base station;

the selecting unit is configured to: select one of the determined temporary base station as the tracking station for performing RTK resolution on the first mobile station; and the resolving unit is configured to: perform RTK resolution according to the selected tracking station for performing RTK resolution on the first mobile station;

wherein the second mobile station is another mobile station other than the first mobile station.

The technical solution of the present application comprises: when a first mobile station uploads an observation value, determining whether a tracking station for performing RTK resolution on the first mobile station is comprised; when determining that the tracking station for performing RTK resolution on the first mobile station is not comprised, determining the second mobile station that obtains an RTK fixed solution and satisfies a preset condition as the temporary base station; selecting one of the determined temporary base stations as the tracking station for performing RTK resolution on the first mobile station; and performing RTK resolution according to the selected tracking station for performing RTK resolution on the first mobile station, wherein the second mobile station is another mobile station other than the first mobile station. In the embodiments of the present invention, when the tracking station for performing RTK resolution on the first mobile station is not comprised, a temporary base station is selected for RTK resolution, and the coverage of an RTK service is expanded without adding tracking stations.

Other features and advantages of the present invention will be described in the following description, and some will be obvious from the description or may be understood by realizing the present invention. The objective and other advantages of the present invention may be achieved and attained by the structure particularly pointed out in the description, claims and drawings.

BRIEF DESCRIPTION OF THE DRAWINGS

The accompanying drawings forming a part of the specification are used to provide a further understanding of the technical solutions of the present invention, and the accompanying drawings and the embodiments of the present application are used together to explain the technical solutions of the present invention and do not constitute a limitation of the technical solutions of the present invention.

DETAILED DESCRIPTION

To describe the purpose, the technical solutions, and the advantages of the present invention more clearly, embodiments of the present invention are described in detail below with reference to the accompanying drawings. It should be noted that the embodiments in the present application and features in the embodiments may be arbitrarily combined with each other in the case of no conflict.

The steps shown in the flow chart of the accompanying drawings may be executed in a computer system such as a group of computer-executable instructions. Also, a logical order is shown in the flow chart, but in some cases, the steps shown or described may be executed in an order different from that herein.

Figure 1:
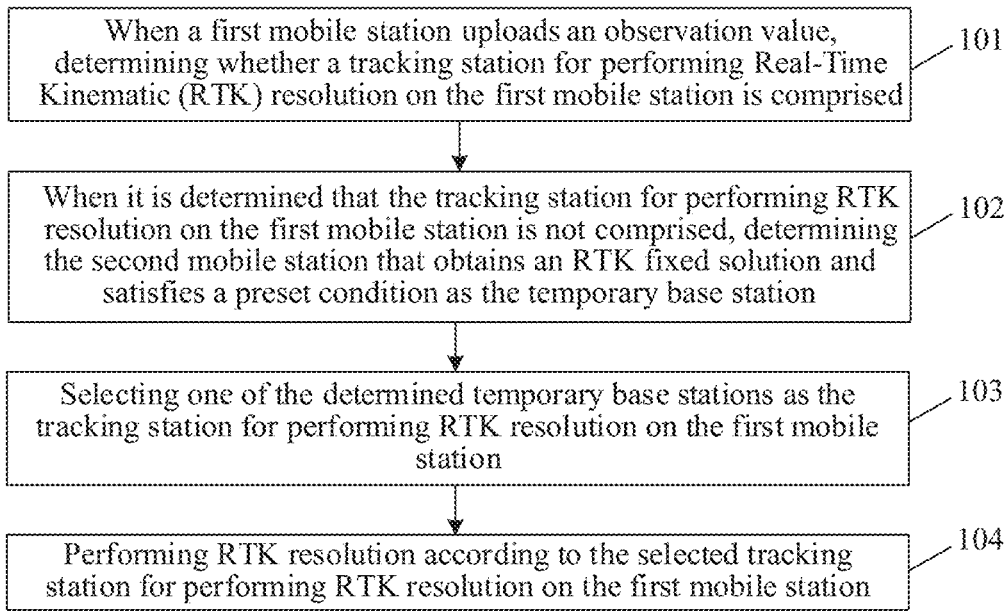
FIG. 1 is the flow chart of the method for realizing positioning resolution according to an embodiment of the present invention.

FIG. 1 is a flow chart of a method for realizing positioning resolution according to an embodiment of the present invention. As shown in FIG. 1, the method comprises the following steps.

At step 101, when a first mobile station uploads an observation value, whether a tracking station for performing Real-Time Kinematic (RTK) resolution on the first mobile station is comprised is determined.

In the embodiments of the present invention, the step of determining whether a tracking station for performing Real-Time Kinematic (RTK) resolution on a second mobile station is comprised comprises: determining whether a cloud platform for performing RTK resolution comprises a tracking station for performing RTK resolution on the second mobile station. When the subject of the RTK resolution changes, it can be determined whether the subject comprises the tracking station for performing RTK resolution on the second mobile station, for example, the subject performing the RTK resolution may also be a mobile station.

In an exemplary example, according to the embodiments of the present invention, the tracking station is determined according to a related protocol, for example, a tracking station within a preset range from the second mobile station in a system is determined as the tracking station for performing RTK resolution on the second mobile station.

At step 102, when it is determined that the tracking station for performing RTK resolution on the first mobile station is not comprised, the second mobile station that obtains an RTK fixed solution and satisfies a preset condition is determined as the temporary base station.

In an exemplary example, according to the embodiments of the present invention, the first mobile station satisfying the preset condition comprises: a mobile station that can fix the ambiguity. In an exemplary example, the location precision of the second mobile stations satisfying the preset condition in the embodiments of the present invention may reach centimeter-level after the ambiguity is fixed.

In an exemplary example, according to the embodiments of the present invention, the temporary base stations may be determined according to the determination conditions of the temporary base stations before the RTK resolution of the first mobile station is performed.

At step 103, one of the determined temporary base stations is selected as the tracking station for performing RTK resolution on the first mobile station.

At step 104, RTK resolution is performed according to the selected tracking station for performing RTK resolution on the first mobile station.

In an exemplary example, according to the embodiments of the present invention, a cloud server or a mobile station performing RTK resolution may be used as a subject to execute the above-mentioned processing. The cloud server comprises, but is not limited to, a server used for RTK resolution in the cloud platform.

In embodiments of the present invention, when the tracking station for performing RTK resolution on the first mobile station is not comprised, a temporary base station is selected for RTK resolution, and the coverage of an RTK service is expanded without adding tracking stations.

In an exemplary example, according to the embodiments of the present invention, the step of selecting one of the determined temporary base stations as the tracking station for performing RTK resolution on the first mobile station comprises:
    determining a temporary base station closest to the first mobile station from the determined temporary base stations; and
    determining the determined temporary base station closest to the first mobile station as the tracking station for performing RTK resolution.

In the embodiments of the present invention, selecting the temporary base station closest to the first mobile station makes it easier to implement ambiguity fixation.

In an exemplary example, according to the embodiments of the present invention, the step of performing RTK resolution according to the selected tracking station for performing RTK resolution on the first mobile station comprises:
    performing the RTK resolution of the first mobile station according to an observation value and a corresponding coordinate of a preset precision of the selected tracking station for performing RTK resolution on the first mobile station.

In an exemplary example, according to the embodiments of the present invention, the preset precision may comprise centimeter-level accuracy.

In an exemplary example, after the second mobile station that obtains an RTK fixed solution and satisfies a preset condition is determined as the temporary base station, the method of the embodiments of the present invention further comprises:
    when a duration for which the second mobile stations determined as the temporary base stations do not upload observation values reaches a first preset duration, deleting the temporary base station;
    when the second mobile station determined as the temporary base station does not satisfy the preset condition, deleting the temporary base station; and
    when the second mobile station determined as the temporary base station is not able to obtain the RTK fixed solution, deleting the temporary base station.

In an exemplary example, according to the embodiments of the present invention, the temporary base station not satisfying the preset condition comprise:
    the observation values of the temporary base station comprise dual-frequency observation values, but the number of the dual-frequency observation values is less than or equal to a first threshold;
    the number of satellites used by the temporary base station to determine the observation value is less than or equal to a second threshold.

In an exemplary example, according to the embodiments of the present invention, the preset condition may be set by persons skilled in the art according to empirical values, for example, the number of observation values of the temporary base station is less than a third threshold. In an exemplary example, the third threshold may be 30.

In an exemplary example, according to the embodiments of the present invention, the addition and deletion the temporary base station may be recorded by setting a list.

In an exemplary example, according to the embodiments of the present invention, the step of determining second mobile station that obtain an RTK fixed solution and satisfy a preset condition as temporary base stations comprises:
    when the second mobile station obtains the RTK fixed solution, and the observation values of the second mobile station comprise dual-frequency observation values and the number of the dual-frequency observation values exceeds a preset first threshold, determining the second mobile station as the temporary base station; or when the second mobile station obtains the RTK fixed solution and the number of satellites used by the second mobile station to determine the observation values exceeds a preset second threshold, determining the second mobile station as the temporary base station.

In an exemplary example, the first threshold may be set and adjusted by persons skilled in the art according to experiences, for example, the first threshold may be 30. In an exemplary example, the second threshold may be set and adjusted by persons skilled in the art according to experiences, for example, the second threshold may be 20.

The embodiments of the present invention further provides a computer storage medium, wherein a computer program is stored in the computer storage medium, and when the computer program is executed by a processor, the method for realizing positioning resolution is implemented.

The embodiments of the present invention further provide a terminal, including a memory and a processor, a computer program being stored in the memory, wherein the processor is configured to execute the computer program in the memory; and when the computer program is executed by the processor, the method for realizing positioning resolution is implemented.

Figure 2:
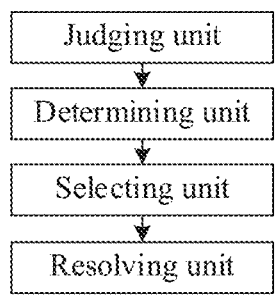
FIG. 2 is the structural block diagram of the apparatus for realizing positioning resolution according to the embodiment of the present invention.

FIG. 2 is a structural block diagram of an apparatus for realizing positioning resolution according to an embodiment of the present invention. As shown in FIG. 2, the apparatus comprises a judging unit, a determining unit, a selecting unit, and a resolving unit, wherein the judging unit is configured to: when a first mobile station uploads an observation value, determine whether a tracking station for performing Real-Time Kinematic (RTK) resolution on the first mobile station is comprised;

the determining unit is configured to: when determining that the tracking station for performing RTK resolution on the first mobile station is not comprised, determine second mobile stations that obtain an RTK fixed solution and satisfy a preset condition as temporary base stations;

the selecting unit is configured to: select one of the determined temporary base stations as the tracking station for performing RTK resolution on the first mobile station; and the resolving unit is configured to: perform RTK resolution according to the selected tracking station for performing RTK resolution on the first mobile station;

wherein the second mobile station is another mobile station other than the first mobile station.

In embodiments of the present invention, when the tracking station for performing RTK resolution on the first mobile station is not comprised, a temporary base station is selected for RTK resolution, and the coverage of an RTK service is expanded without adding tracking stations.

In an exemplary example, according to the embodiments of the present invention, the selecting unit is configured to:

determine a temporary base station closest to the first mobile station from the determined temporary base stations; and determine the determined temporary base station closest to the first mobile station as the tracking station for performing RTK resolution.

In an exemplary example, according to the embodiments of the present invention, the resolving unit is configured to:

perform the RTK resolution of the first mobile station according to an observation value and a corresponding coordinate of a preset precision of the selected tracking station for performing RTK resolution on the first mobile station.

In an exemplary example, according to the embodiments of the present invention, the determining unit is further configured to:

when a duration for which the second mobile stations determined as the temporary base stations do not upload observation values reaches a first preset duration, delete the temporary base stations;

when the second mobile stations determined as the temporary base stations do not satisfy the preset condition, delete the temporary base stations; and when the second mobile stations determined as the temporary base stations are not able to obtain the RTK fixed solution, delete the temporary base stations.

In an exemplary example, according to the embodiments of the present invention, the determining unit is configured to:

when the second mobile stations obtain the RTK fixed solution, and the observation values of the second mobile stations comprise dual-frequency observation values and the number of the dual-frequency observation values exceeds a preset first threshold, determine the second mobile stations as the temporary base stations; or when the second mobile stations obtain the RTK fixed solution and the number of satellites used by the second mobile stations to determine the observation values exceeds a preset second threshold, determine the second mobile stations as the temporary base stations.

The embodiments of the present invention are briefly described through application examples, and the application examples are only used to state the embodiments of the present invention and are not used to limit the scope of protection of the present invention.

APPLICATION EXAMPLES

Figure 3:
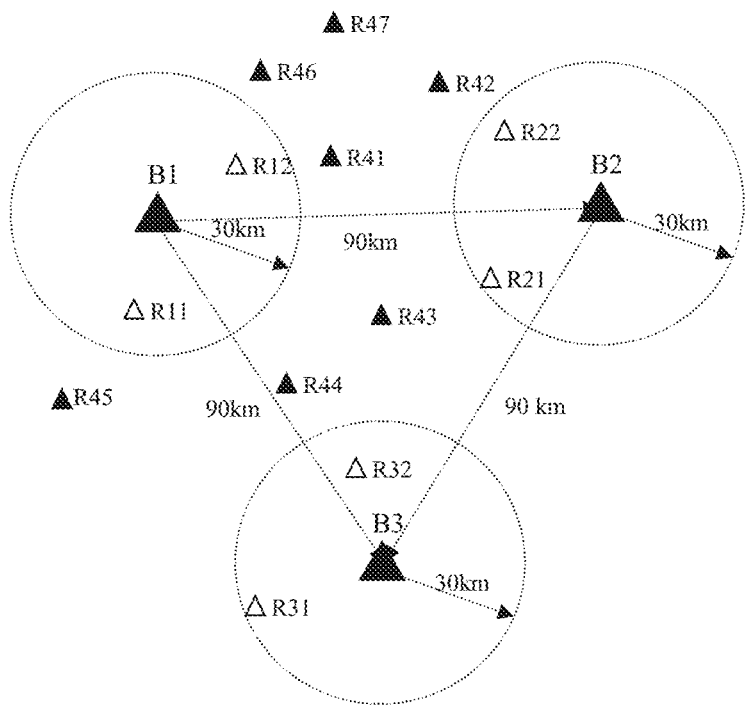
FIG. 3 is the network schematic diagram of the RTK service in the related art.

In a cloud platform RTK resolution service in the related art, each tracking station may provide a correction service for mobile stations within 30 kilometers in the vicinity of the tracking station, but beyond 30 kilometers, the mobile stations are difficult to fix even the correction service is provided. FIG. 3 is a network schematic diagram of an RTK service in related art. As shown in FIG. 3, a region of an RTK positioning service platform comprises three tracking stations B1, B2, and B3, and the distances among the tracking stations are 90 kilometers. At a certain moment, the cloud platform receives the observation values of mobile stations R11, R12, R21, R22, R31, R32, R41, . . . , R47, etc. and requests RTK resolution. The distances from R11 and R12 to the tracking station B1 are both less than 30 kilometers, thus RTK ambiguity fixation can be implemented. The distances from R21 and R22 to the tracking station B2 are less than 30 kilometers, and the distances from R31 and R32 to the tracking station B3 are also less than 30 kilometers, thus RTK ambiguity fixation can be implemented. However, the distances from R41, R42, . . . and R47 to any one of the three tracking stations B1, B2, B3 are all more than 30 kilometers, and even if the closest tracking station is selected therefor, it is difficult to fix the ambiguity because a baseline is too long and error correlation is weakened, and therefore, it is difficult to provide a centimeter-level RTK positioning service for R41, R42, . . . , and R47.

Figure 4:
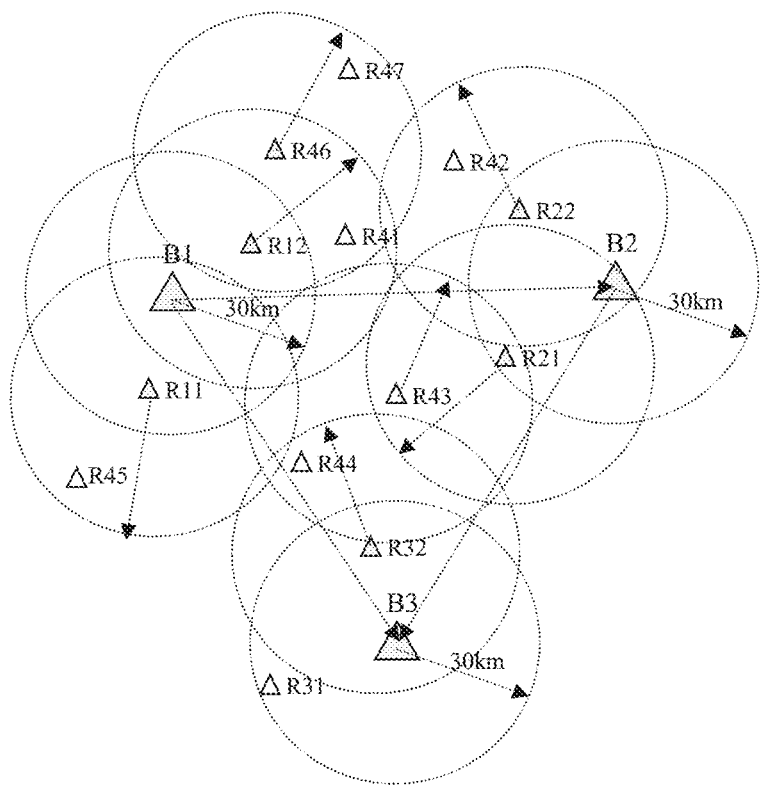
FIG. 4 is the network schematic diagram of the RTK service according to the application example of the present invention.

Since the cloud platform may fix the ambiguity for the observation values of the users R11, R12, R21, R22, R31, and R32, and provide an RTK positioning service, the positioning precision of R11, R12, R21, R22, R31, and R32 may reach centimeter-level. In the application examples of the present invention, by using these ambiguity-fixed mobile stations as temporary base stations, and by means of the observation values uploaded by the mobile stations determined as the temporary base stations and the coordinates of the mobile stations reaching centimeter-level accuracy, an RTK correction service is provided for other mobile stations outside the coverage region. FIG. 4 is a network schematic diagram of an RTK service according to an application example of the present invention. As shown in FIG. 4, the ambiguity-fixed mobile station (user station) R12 may be used as a temporary base station to provide an RTK correction service for the mobile stations R41 and R46 within a distance of 30 kilometers. Similarly, after using the mobile station R12 as a temporary base station to fix the ambiguity, the mobile station R46 may be used as the temporary base station to provide an RTK correction service for the mobile station R47. Similarly, the ambiguity-fixed mobile station R11 may provide a correction service for the mobile station R45, R22 provides a correction service for R42, R21 provides a correction service for R43, R32 provides a correction service for R44, and so on. Based on the above-mentioned processing, mobile stations that cannot obtain centimeter-level RTK positioning services, i.e., R41, R42, . . . , R47, may all use other mobile stations that have obtained centimeter-level RTK positioning services as temporary base stations to obtain centimeter-level RTK positioning services. The mobile stations R41, R42, . . . , R47 obtaining centimeter-level RTK positioning services may also be used as temporary base stations for serving more mobile stations. The more mobile stations, the more temporary base stations the platform may use. Even if the cloud RTK service platform has only three base stations B1, B2 and B3 with a distance of 90 kilometers from one another in this region, the platform can not only provide a centimeter-level RTK positioning service for mobile stations within a triangle formed by B1, B2, and B3, but also expand a high-precision RTK service beyond the triangle. In the application examples of the present invention, by determining the mobile stations as the temporary base stations, not only the service range of the RTK positioning service can be expanded, but also the distance between the mobile stations and the base stations can be shortened.

In this application example, the mobile station that may be used as a temporary base station is necessarily a mobile station having a fixed ambiguity and a centimeter-level positioning precision. In an exemplary example, the temporary base station may also be defined as if dual-frequency observation values are required, the number of satellites exceeds a certain number (e.g., 20), or the number of observation values exceeds a certain number (e.g., 30). When the temporary base station maintains a fixed ambiguity and the observation values satisfy the requirements above, the temporary base station may continue to be used as a temporary base station, and once the observation values of the mobile station are reduced, and the observation value condition is not satisfied or the fixed solution cannot be obtained, the mobile station is not used as a temporary base station. The tracking station is a high-precision receiver built on a known point location, and may upload its own location and observation values to a mobile station or a cloud platform. In the application examples of the present invention, a cloud RTK service, i.e., receiving a large amount of tracking station data and a large amount of mobile station data and providing RTK resolution for the mobile stations, is fully utilized, and a mobile station of which the observation condition is good and the RTK resolution can reach centimeter-level precision is determined as a temporary base station to provide a correction service for other nearby mobile stations. In this way, the defect that RTK resolution cannot be provided for some mobile stations when the density of tracking stations is not enough can be overcome, the coverage of the cloud RTK service is expanded, and costs of the cloud RTK service are reduced.

Persons of ordinary skill in the art may understand that all or some of the steps in the method disclosed above, the system, and the functional modules/units in the apparatus can be implemented as software, firmware, hardware, and appropriate combinations thereof. In a hardware implementation, the division of the functional modules/units mentioned in the description above does not necessarily correspond to the division of physical components, for example, one physical component may have multiple functions, or one function or step may be executed by several physical components cooperatively. Some or all of the components may be implemented as software executed by a processor, such as a digital signal processor or microprocessor, or be implemented as hardware, or be implemented as an integrated circuit, such as an application-specific integrated circuit. Such software may be distributed on a computer readable medium, and the computer readable medium may comprise a computer storage medium (or a non-transitory medium) and a communication medium (or a transitory medium). As is well known to persons of ordinary skill in the art, the term "computer storage media" comprises volatile and nonvolatile, removable and non-removable media implemented in any method or technology for storage of information (such as computer readable instructions, data structures, program modules, or other data). The computer storage media comprise, but are not limited to, an RAM, an ROM, an EEPROM, a flash memory or other memory technologies, a CD-ROM, a digital versatile disk (DVD) or other optical disk storages, a magnetic cartridge, a magnetic tape, magnetic disk storage or other magnetic storage apparatuses, or any other medium that can be used to store desired information and that can be accessed by a computer. In addition, as is well known to persons of ordinary skill in the art, a communication medium generally comprises computer readable instructions, data structures, program modules, or other data in a modulated data signal such as a carrier or other transmission mechanisms, and may comprise any information delivery medium.

The invention claimed is:

1. A method for realizing positioning resolution, comprising:
   when a first mobile station uploads a first observation value, determining whether there is a near tracking station to perform Real-Time Kinematic (RTK) processing with the first mobile station;
   when determining there is no near tracking station to perform RTK processing with the first mobile station, determining a second mobile station that has obtained an RTK fixed solution and satisfies a preset condition as a temporary base station;
   selecting one of determined temporary base stations as the tracking station to perform RTK processing with the first mobile station; and
   using the selected tracking station to perform RTK processing with the first mobile station;
   wherein the second mobile station is another mobile station other than the first mobile station, and
   wherein the near tracking station is within 30 kilometers in distance of the first mobile station.

2. The method according to claim 1, wherein selecting one of the determined temporary base stations as the tracking station to perform RTK processing with the first mobile station comprises:
   determining the temporary base station closest to the first mobile station from the determined temporary base stations; and
   using the determined temporary base station closest to the first mobile station as the tracking station the to perform RTK processing with the first mobile station.

3. The method according to claim 1, wherein performing RTK processing using the selected tracking station for performing RTK processing with the first mobile station comprises:
   performing the RTK processing for the first mobile station, using an observation value of the selected tracking station and a corresponding precise coordinate, which is a latest RTK fixed solution, of the selected tracking station, and the observation of the first mobile station.

4. The method according to claim 1, wherein after determining the second mobile station that obtains the RTK fixed solution and satisfies the preset condition as the temporary base station, the method further comprises:
   when a duration for which the second mobile station determined as the temporary base station does not upload an observation value of the second mobile station reaches a first preset duration, deleting the temporary base station;
   when the second mobile station determined as the temporary base station does not satisfy the preset condition, deleting the temporary base station; and
   when the second mobile station determined as the temporary base station can not obtain the RTK fixed solution, deleting the temporary base station.

5. The method according to claim 1, wherein determining the second mobile station that obtains the RTK fixed solution and satisfies the preset condition as the temporary base station comprises:

when the second mobile station obtains the RTK fixed solution, and an observation value of the second mobile station comprises dual-frequency observation values and a number of the dual-frequency observation values exceeds a preset first threshold, determining the second mobile station as the temporary base station; or when the second mobile station obtains the RTK fixed solution and the number of satellites used by the second mobile station to determine the observation value of the second mobile station exceeds a preset second threshold, determining the second mobile station as the temporary base station.

6. A computer storage medium, wherein a computer program is stored in the computer storage medium, and when the computer program is executed by a processor, the method for realizing positioning resolution according to claim 1 is implemented.

7. A terminal, comprising a memory and a processor, a computer program being stored in the memory, wherein the processor is configured to execute the computer program in the memory; and when the computer program is executed by the processor, the method for realizing positioning resolution according to claim 1 is implemented.

8. An apparatus for realizing positioning resolution, comprising a judging unit, a determining unit, a selecting unit, and a resolving unit, wherein the judging unit is configured to: when a first mobile station uploads a first observation value, determine whether there is a tracking station for performing Real-Time Kinematic (RTK) resolution on the first mobile station;

the determining unit is configured to: when determining that there is no tracking station to perform RTK processing for the first mobile station, determine a second mobile station that obtains an RTK fixed solution and satisfies a preset condition as a temporary base station;

the selecting unit is configured to: select one of determined temporary base stations as the tracking station to perform RTK processing for the first mobile station; and the resolving unit is configured to: perform RTK processing between the selected tracking station and the first mobile station;

wherein the second mobile station is another mobile station other than the first mobile station, and wherein the tracking station is within 30 kilometers in distance of the first mobile station.

9. The apparatus according to claim 8, wherein the selecting unit is configured to:

determine the temporary base station closest to the first mobile station from one of the determined temporary base stations; and determine the determined temporary base station closest to the first mobile station as the tracking station to perform the RTK processing.

10. The apparatus according to claim 8, wherein the resolving unit is configured to:

perform the RTK processing for the first mobile station using an observation value of the selected tracking station and a corresponding precise coordinate, which is a latest RTK fixed solution, of the selected tracking station, and the observation of the first mobile station.

\* \* \* \* \*